United States Patent
Robinson et al.

(10) Patent No.: US 8,423,258 B2
(45) Date of Patent: Apr. 16, 2013

(54) VEHICLE SPEED ESTIMATION FOR 4WD VEHICLES UNDER WHEEL-SPINNING SITUATIONS

(75) Inventors: Rick Robinson, Farmington Hills, MI (US); Qingyuan Li, Ann Arbor, MI (US); Hsien-cheng Wu, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/433,539

(22) Filed: Mar. 29, 2012

(65) Prior Publication Data

US 2012/0253627 A1 Oct. 4, 2012

Related U.S. Application Data

(60) Provisional application No. 61/468,971, filed on Mar. 29, 2011.

(51) Int. Cl.
*G05D 17/00* (2006.01)

(52) U.S. Cl.
USPC .............................................. 701/88; 701/82

(58) Field of Classification Search ............... 701/88, 701/82, 80, 84, 89, 90, 70, 71, 74; 702/142, 702/141, 145, 146, 148; 180/197, 248, 233; 303/150, 151, 153, 138, 139
See application file for complete search history.

(56) References Cited

U.S. PATENT DOCUMENTS

| 4,982,348 | A | | 1/1991 | Matsuda et al. | |
|---|---|---|---|---|---|
| 5,719,770 | A | | 2/1998 | Matsuno | |
| 5,961,565 | A | * | 10/1999 | Kawabe et al. | 701/90 |
| 6,015,192 | A | | 1/2000 | Fukumura | |
| 7,421,328 | B2 | | 9/2008 | Watanabe et al. | |
| 7,617,036 | B2 | | 11/2009 | Tan et al. | |
| 2003/0141128 | A1 | | 7/2003 | Hessmert et al. | |
| 2005/0274560 | A1 | * | 12/2005 | Wakao et al. | 180/197 |
| 2009/0210128 | A1 | | 8/2009 | Fujimoto et al. | |

OTHER PUBLICATIONS

Kobayashi et al., "Estimation of Absolute Vehicle Speed Using Fuzzy Logic Rule-Based Kalman Filter," Proceedings of the American Control Conference, Seattle, WA, Jun. 1995, pp. 3086-3090.
Pusca et al., "Fuzzy Logic Speed Estimator to Drive a Four Electric Wheels Truck," The 4th Power Electronics and Motion Control Conference Proceedings, IPEMC 2004, pp. 1448-1453.
PCT/US2012/031075 International Search Report and Written Opinion dated Jul. 5, 2012.

* cited by examiner

*Primary Examiner* — Marthe Marc-Coleman
(74) *Attorney, Agent, or Firm* — Michael Best & Friedrich LLP

(57) ABSTRACT

Systems and methods for detecting wheel-spinning situations of a vehicle. One system includes a controller. The controller is configured to determine a speed of each wheel of the vehicle based on information received from a plurality of wheel speed sensors, to identify a second slowest wheel of the vehicle based on the speed of each wheel, to calculate a vehicle acceleration torque based on an acceleration of the second slowest wheel of the vehicle and a mass of the vehicle, to calculate a torque ratio based on the vehicle acceleration torque and a wheel drive torque, and to activate a traction control system when the torque ratio is greater than a predetermined threshold.

15 Claims, 10 Drawing Sheets

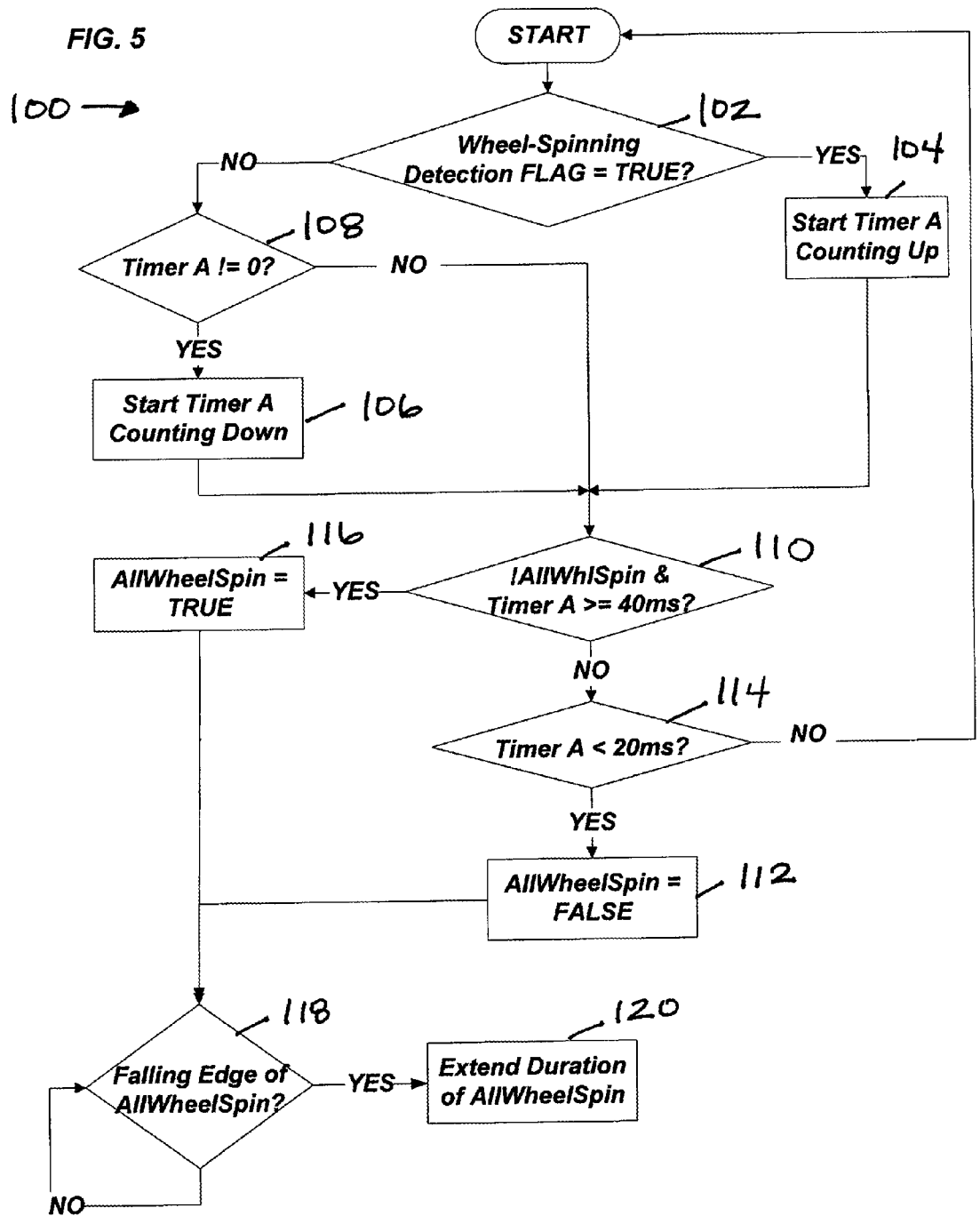

VEHICLE SPEED ESTIMATION FOR 4WD VEHICLES UNDER WHEEL-SPINNING SITUATIONS

RELATED APPLICATIONS

This application claims priority to U.S. Provisional Application 61/468,971 filed Mar. 29, 2011, the entire contents of which are hereby incorporated by reference.

SUMMARY

Under normal driving situations, vehicle acceleration is approximately equal to wheel acceleration. In other words, vehicle acceleration torque is approximately equal to the sum of wheel rotational torque, wheel inertia torque, wind resistance torque, and wheel brake torque. Vehicle acceleration torque and wheel drive torque can be used by a vehicle control system to determine whether the vehicle's wheels have lost traction and are spinning. For example, when a large amount of drive torque is applied to the wheels of an all-wheel or four-wheel drive vehicle, all four wheels can spin simultaneously. This is especially true when the vehicle is located on a surface with a low homogenous coefficient of friction ("$\mu$") (e.g., such as an icy surface). When traction is lost, a traction control system ("TCS") can control torque to improve vehicle performance.

To detect wheel-spinning situations, the vehicle control system can calculate a torque ratio by dividing the sum of vehicle acceleration torque by actual wheel drive torque. If the vehicle's wheels are not spinning, the torque ratio will be approximately 1.0. However, if a wheel is spinning, the wheel drive torque will be less than the vehicle acceleration torque and the torque ratio will be substantially greater than 1.0. Therefore, if the torque ratio is substantially greater than 1.0, the vehicle control system determines that one or more of the vehicle's wheels are spinning and assistance from the TCS is needed.

However, during a four-wheel spinning situation, the vehicle speed is the same as the wheel speed, therefore, the TCS may not activate (or may activate too late), which results in unstable vehicle control.

Embodiments of the invention provide methods and systems for controlling vehicles experiencing wheel-spinning situations. The methods and systems (1) detect wheel-spinning situations, (2) check for wheel-spinning entry conditions, and (3) update a reference vehicle speed to improve subsequent wheel-spinning detection.

One embodiment of the invention provides a system for detecting wheel-spinning situations of a vehicle. The system includes a controller. The controller is configured to determine a speed of each wheel of the vehicle based on information received from a plurality of wheel speed sensors, to identify a second slowest wheel of the vehicle based on the speed of each wheel, to calculate a vehicle acceleration torque based on an acceleration of the second slowest wheel of the vehicle and a mass of the vehicle, to calculate a torque ratio based on the vehicle acceleration torque and a wheel drive torque, and to activate a traction control system when the torque ratio is greater than a predetermined threshold.

Another embodiment of the invention provides a computer-implemented method for detecting wheel-spinning situations of a vehicle. The method includes receiving, at a processor, information from a plurality of wheel speed sensors and determining a speed of each wheel of the vehicle based on the information from the plurality of wheel speed sensors. The method also includes identifying a second slowest wheel of the vehicle based on the speed of each wheel, calculating a vehicle acceleration torque based on an acceleration of the second slowest wheel of the vehicle and a mass of the vehicle, and calculating a torque ratio based on the vehicle acceleration torque and a wheel drive torque. The method further includes activating a traction control system when the torque ratio is greater than a predetermined threshold.

Other aspects of the invention will become apparent by consideration of the detailed description and accompanying drawings.

BRIEF DESCRIPTION OF THE DRAWINGS

FIG. 5 is a flow chart illustrating a wheel spinning flag management method performed by the system of FIG. 1.

FIGS. 6b and 7b graphically illustrate values of the various flags and values used by the system of FIG. 1 to perform the methods of FIGS. 3-5, 6a, and 7a.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
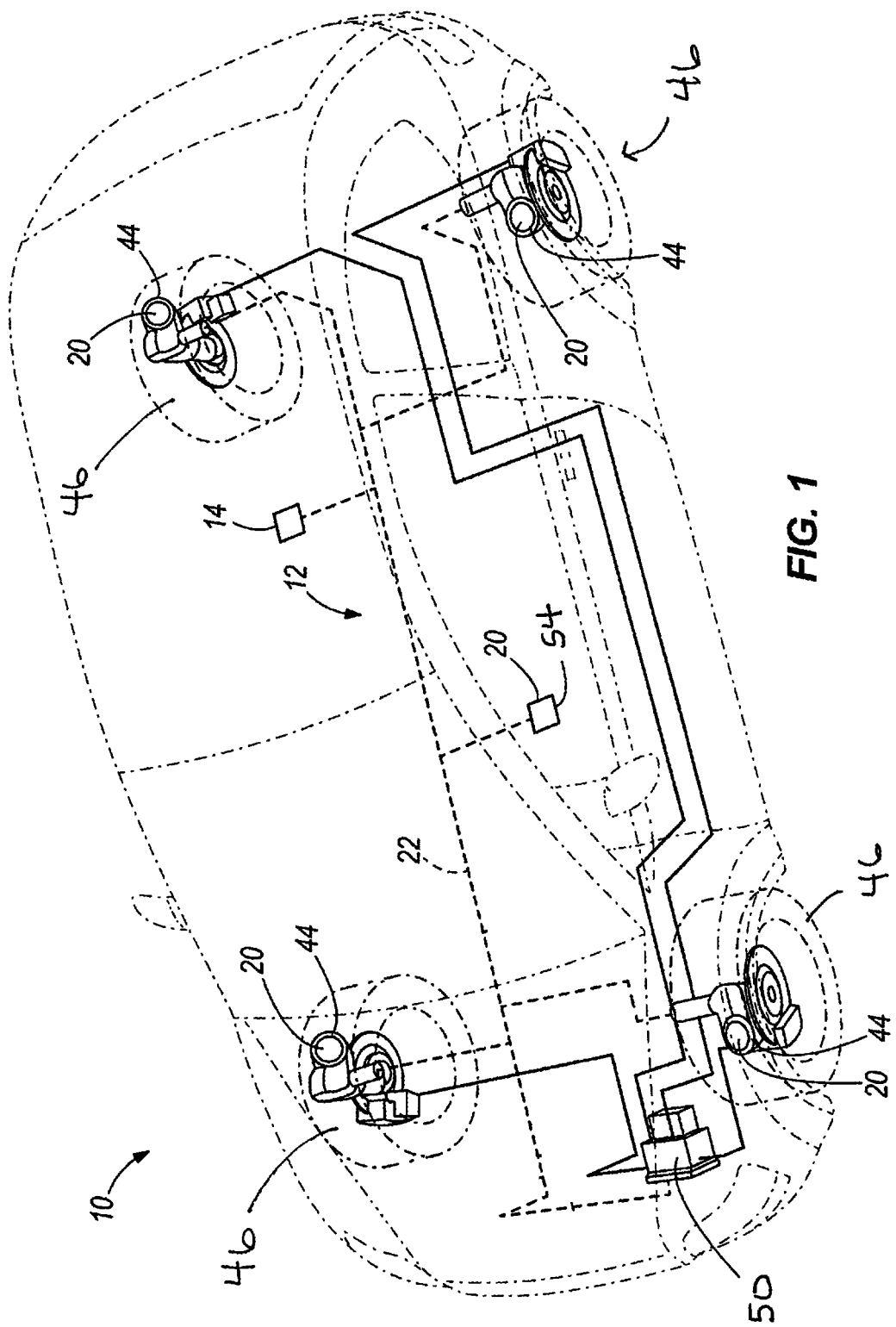
FIG. 1 illustrates a vehicle including a vehicle control system.

FIG. 1 illustrates a vehicle 10. The vehicle 10 includes a vehicle control system 12. The system 12 includes a controller 14 and a plurality of sensors. In FIG. 1, each sensor is labeled with the reference numeral 20 as well as a second reference numeral. The second reference numerals, which are described in more detail below, provide a specific label to differentiate various types of sensors from one another. The sensors 20 are connected to a network, such as a controller area network ("CAN") bus 22. The sensors 20 provide information regarding the operating parameters of the vehicle 10.

Figure 2:
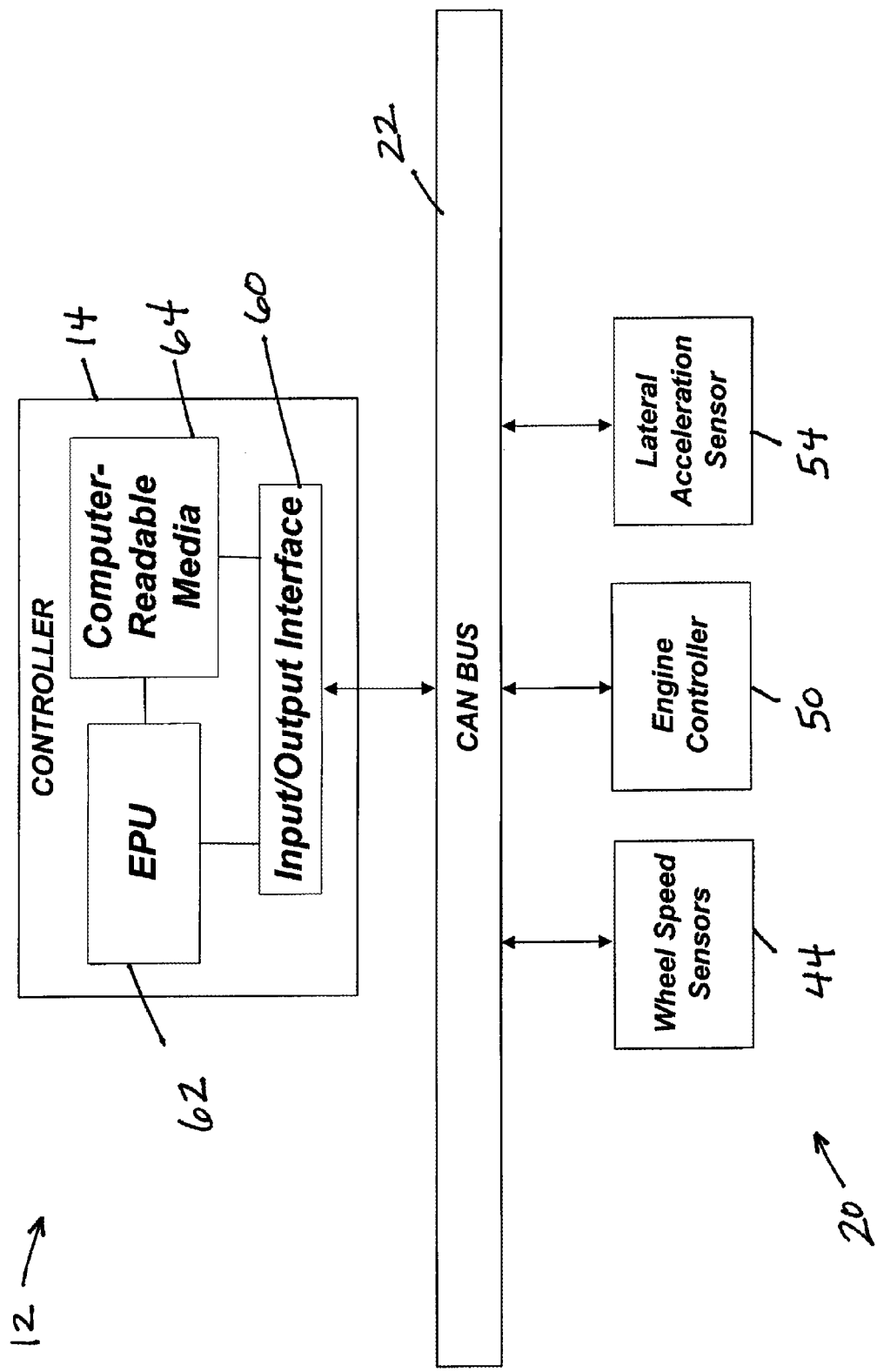
FIG. 2 schematically illustrates the vehicle control system of FIG. 1.

FIG. 2 schematically illustrates the vehicle control system 12 in more detail. As shown in FIG. 2, the system 12 includes the controller 14, the one or more sensors 20, and the bus 22. In some embodiments, the controller 14 obtains sensor readings directly from one or more of the sensors 20 rather than over the bus 22. In some circumstances, the controller 14 uses compensated sensor readings rather than raw data. For example, the controller 14 can compensate one or more of the sensor readings by applying an offset. The controller 14 can use the offsets to compensate for sensor aging, fouling, and other signal corruption that may occur. Furthermore, it should be understood that in some embodiments other types of sensors 20 can be included in the system 12. Also, the controller 14 may only use information from a subset of the sensors 20 illustrated in FIGS. 1-2 to detect wheel-spinning situations.

Furthermore, the arrangement and positions of the system components shown in FIGS. 1-2 is for illustrative purposes only. Also, in some embodiments, the controller 14 can be combined with other controllers, such as an engine controller.

As shown in FIG. 2, the sensors 20 include a wheel speed sensor 44 associated with each wheel 46 of the vehicle 10. Each wheel speed sensor 44 provides a speed of a wheel 46. In some embodiments, the wheel speed sensors 44 also provide an acceleration of each wheel 46. In other embodiments, separate sensors provide wheel accelerations or the controller 14 calculates wheel acceleration based on wheel speeds provided by the wheel speed sensors 44.

The sensors 20 can also include engine sensors (not shown) that transmit information representing a current state of the vehicle's engine through an engine controller 50 connected to the bus 22. For example, the engine controller 50 can provide signals representing an engine or drive torque delivered to the wheels 46. Alternatively or in addition, in some embodiments, the controller 14 receives information associated with the engine directly from such engine sensors, which can include an engine camshaft sensor, rather than through the engine controller 50. The sensors 20 can also include a lateral acceleration sensor 54.

As shown in FIG. 2, the controller 14 includes an input/output interface 60, an electronic processing unit ("EPU") 62, and one or more non-transitory memory modules 64, such as a random access memory ("RAM") and read-only memory ("ROM"). The input/output interface 60 transmits and receives information over the bus 22, including sensor readings from the sensors 20. The input/output interface 60 can communicate with other components inside the vehicle 10 (e.g., over the CAN 22) and outside of the vehicle 10. For example, the input/output interface 60 can include a network interface, such as an Ethernet card or a wireless network card, that allows the system 12 to send and receive information over a network, such as a local area network or the Internet.

The EPU 62 receives the information from the input/output interface 60 and processes the information by executing one or more instructions or modules. The instructions or modules are stored in the non-transitory computer-readable medium 64. The EPU 62 stores information (e.g., information received from the bus 22 or information generated by instructions or modules executed by the EPU 62) to the computer-readable medium 64. It should be understood that although only a single EPU, computer-readable media module, and input/output interface are illustrated in FIG. 2, the controller 14 can include multiple processing units, memory modules, and/or input/output interfaces.

The instructions stored in the computer-readable media provide particular functionality when executed by the EPU 62. In general, the instructions provide one or more ways for the system 12 to detect and react to wheel-spinning situations. For example, FIGS. 3-6 are flow charts illustrating a wheel-spinning detection and reaction method 70 performed by the controller 14.

Figure 3:
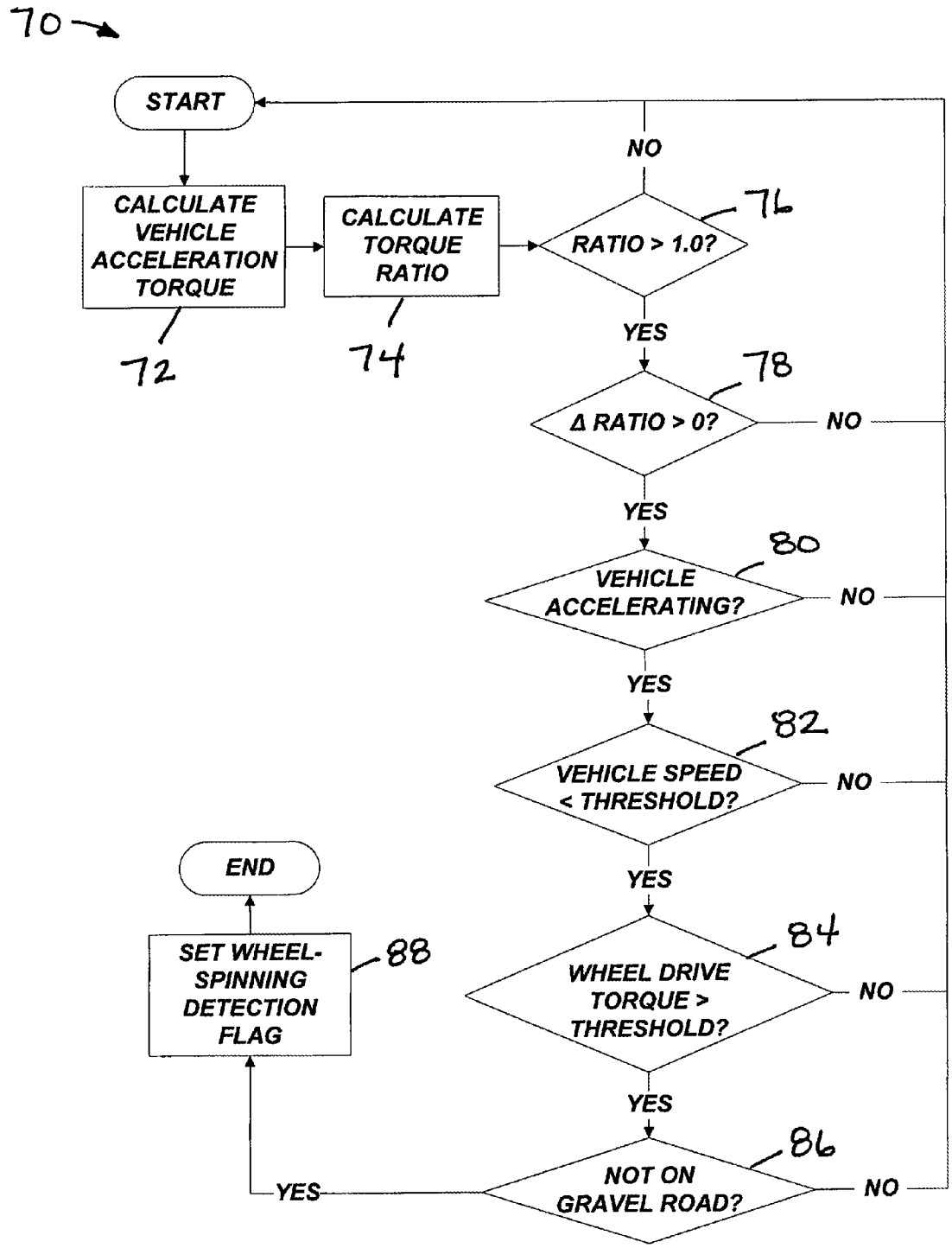
FIG. 3 is a flow chart illustrating a wheel-spinning detection method performed by the system of FIG. 1.
Figure 4:
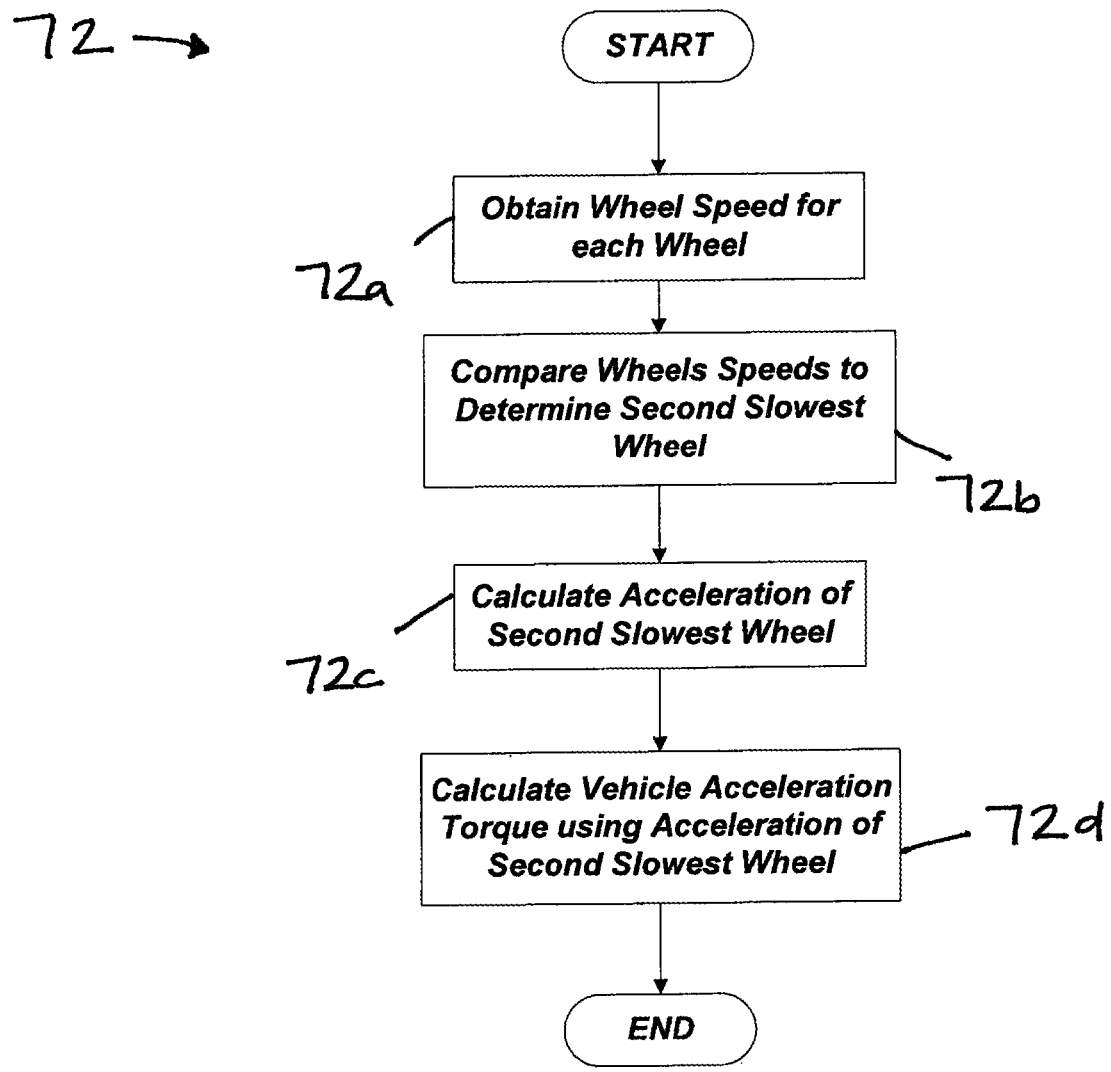
FIG. 4 is a flow chart illustrating a vehicle acceleration torque calculation method performed by the system of FIG. 1.

As illustrated in FIG. 3, to detect wheel-spinning situations, the controller 14 calculates vehicle acceleration torque (at 72). Unlike existing systems that estimate vehicle acceleration using wheel rotational torque, wheel inertia torque, wind resistance torque, and wheel brake torque, the controller 14 calculates vehicle acceleration torque using the acceleration of the second slowest wheel 46. In particular, as illustrated in FIG. 4, the controller 14 obtains a wheel speed from each wheel speed sensor 44 over the over the CAN bus 22 (at 72a). To determine the second slowest wheel 46, the controller 14 compares the readings from the wheel speed sensors 44 (at 72b). The controller 14 then determines the acceleration of the identified second slowest wheel (at 72c). The controller 14 then uses the formula Force=mass*acceleration (F=ma) to calculate vehicle acceleration torque using the acceleration of the second slowest wheel 22 of the vehicle 10 and the mass of the vehicle (at 72d).

The resulting product represents the vehicle acceleration torque, which the controller 14 uses to calculate the torque ratio (at 74, FIG. 3). As described above in the summary section, the torque ratio is calculated by dividing the vehicle acceleration torque by the actual wheel drive torque (e.g., based on information from the engine controller 50). By calculating the vehicle acceleration torque based on the acceleration of the second slowest wheel, the controller 14 prevents the vehicle acceleration torque from following wheel conditions and disguising a wheel-spinning situation. Therefore, in wheel-spinning situations, the vehicle acceleration torque will be greater than the actual wheel drive torque, and the torque ratio will greater than normal (i.e., greater than approximately 1.0) and may be approximately 3.0.

Accordingly, as shown in FIG. 3, after calculating the torque ratio (at 74), the controller 14 determines if the calculated torque ratio is greater than a predetermined threshold (e.g., approximately 1.0 or approximately 3.0) (at 76). If the ratio is not greater than the predetermined threshold, the controller 14 starts the detection process over. In some embodiments, the controller 14 substantially continuously calculates a current vehicle acceleration torque and associated torque ratio. In other embodiments, the controller 14 calculates current vehicle acceleration and associated torque ratio on a cycle associated with predetermined timing (e.g., every 20 milliseconds).

Alternatively, if the torque ratio is greater than the predetermined threshold (at 76), the controller 14 optionally ensures various conditions are satisfied before concluding that a wheel-spinning situation is occurring. For example, as illustrated in FIG. 3, the controller 14 determines if the differential of the torque ratio over a predetermined time is greater than approximately zero (at 78). In particular, the controller 14 determines if the torque ratio has been changing or has been relatively constant. If the torque ratio differential is not greater than approximately zero (i.e., the torque ratio has been relatively constant), the controller 14 concludes that a wheel-spinning situation is not occurring and starts the detection cycle over.

Alternatively, if the torque ratio differential is greater than approximately zero, the controller 14 determines if the vehicle is in an acceleration mode (at 80). To determine if the vehicle is in an acceleration mode, the controller 14 can determine if the calculated vehicle acceleration torque is constant or has been changing. Alternatively, the controller 14 can calculate vehicle acceleration based on vehicle speed, average wheel speed, and average wheel acceleration. If the vehicle is not in an acceleration mode (e.g., the vehicle's speed has been constant over a predetermined time), the controller 14 concludes that a wheel-spinning situation is not occurring and starts the detection cycle over.

If the vehicle is in an acceleration mode (at 80), the controller 14 determines if the current vehicle speed is less than a predetermined threshold (e.g., 70 kilometers per hour) (at 82). The controller 14 can calculate vehicle speed based on wheel speed. If the current vehicle speed is greater than the predetermined threshold, the controller 14 starts the detection process over.

If the current vehicle speed is less than the predetermined threshold (at 82), the controller 14 determines if the actual wheel drive torque is greater than a predetermined threshold (at 84). The wheel drive torque is determined by the controller 14 based on engine torque. For example, in some arrangements, the controller 14 checks for a minimum drive torque by determining a torque delivered by the vehicle's engine (e.g., using the normal force of the vehicle times a very low coefficient of friction, such as 0.1). If the wheels 46 of the vehicle 10 are not being driven by a high torque force (e.g., 800 Newton-meters), it is unlikely that a wheel-spinning situation is occurring. Therefore, if the wheel driving torque is not greater than the predetermined threshold, the controller ends the current detection process and starts the process over.

As shown in FIG. 3, if the wheel driving torque is greater than the predetermined threshold, the controller 14 determines if the vehicle 10 is currently traveling on a gravel road (at 86). If the vehicle 10 traveling on a gravel road, some degree of wheel-spinning is expected and the vehicle's TCS may not be able to aid a driver in this situation. In some embodiments, the controller 14 determines if the vehicle 10 is on a gravel road based on wheel speed, acceleration, and jerk. If the vehicle is on a gravel road, the controller 14 starts the detection process over.

Alternatively, if the vehicle is not traveling on a gravel road, the controller 14 concludes that a wheel-spinning situation is occurring and all of the entry conditions (at 78, 80, 82, 84, 86) have been satisfied. Therefore, the controller 14 sets a wheel-spinning detection flag (e.g., "TRUE") (at 88). It should be understood that the controller 14 can check the entry conditions described above (at 78, 80, 82, 84, and 86) in various orders and, in some embodiments, may check some of the conditions in parallel. Also, the controller 14 may check additional entry conditions before concluding that a wheel-spinning situation is occurring.

In some embodiments, to prevent false detection of wheel-spinning situations, the controller 14 tracks how long the wheel-spinning detection flag has been set to "TRUE" to identify when a true wheel-spinning situation is occurring. For example, FIG. 5 is a flow chart illustrating a wheel-spinning detection flag management method 100 performed by the controller 14. As illustrated in FIG. 5, the controller 14 tracks the amount of time the wheel-spinning detection flag has been set to "TRUE" and sets an all-wheel-spinning flag (i.e., "AllWheelSpin") to "TRUE" after the wheel-spinning detection flag has been set to "TRUE" for a predetermined hold time (e.g., approximately 40 milliseconds). After the all-wheel-spinning flag is set to "TRUE," the controller 14 starts reactive measures to counteract the wheel-spinning situation.

In particular, as shown in FIG. 5, after the wheel-spinning detection flag is set to "TRUE" (at 102), the controller 14 starts a timer ("Timer A") and starts the timer counting up (at 104). When the wheel-spinning detection flag has not yet been set, the controller 14 starts the timer (i.e., Timer A) counting down (at 106) until it reaches zero (at 108).

After the timer has been started (at 104), the controller 14 tracks if the timer has reached or exceeded the predetermined hold time and the all-wheel-spinning flag has not yet been set (i.e., the all-wheel-spinning flag is currently set to "FALSE") (at 110). Until this occurs, the controller 14 sets the all-wheel-spinning flag to "FALSE" (at 112) while the timer is less than the hold time (e.g., less than approximately 20 milliseconds) (at 114). Alternatively, once the timer reaches the hold time and the all-wheel-spinning flag has not yet been set to "TRUE" (at 110), the controller 14 sets the all-wheel-spinning flag to "TRUE" (at 116). After this flag is set to "TRUE," the controller can take corrective action to mitigate the wheel-spinning situation. Also, to ensure that the controller 14 takes the proper reactive measures before the all-wheel-spinning flag is reset to "FALSE," the controller 14 can extend the duration of the all-wheel-spinning flag (at 118) after the flag is subsequently reset to "FALSE" (e.g., after the falling edge of the duration of the all-wheel-spinning flag is detected and while the TCS is not active) (at 120). For example, the controller 14 can allow for an extra 200 milliseconds after the all-wheel-spinning flag is reset to "FALSE," to provide sufficient processing time for the controller 14.

Figure 6A:
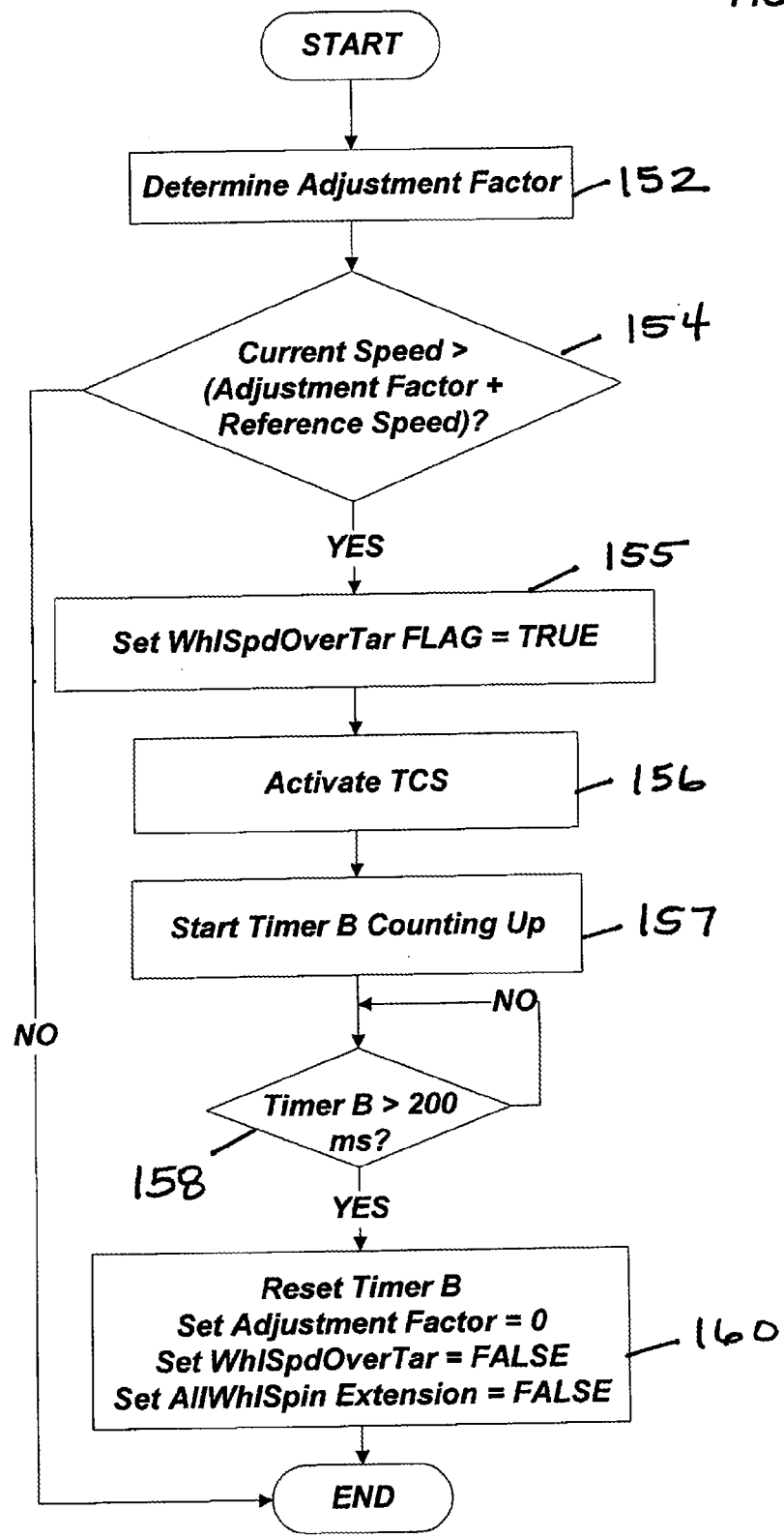
FIGS. 6a and 7a are flow charts illustrating reactive methods performed by the system of FIG. 1 when a wheel-spinning situation is detected.

After the all-wheel-spinning flag has been set to "TRUE" (and extended as needed), the controller 14 takes reactive measures to address the wheel-spinning situation. FIG. 6a is a flow chart illustrating a reactive method 150 performed by the controller 14 according to one embodiment of the invention. As illustrated in FIG. 6a, the controller 14 determines an adjustment factor (i.e., "vDeltaSlip") for a base or reference wheel speed (i.e., "vFzRef") associated with the vehicle's TCS (at 152). The adjustment factor, when added to the base speed, provides a current target speed for when to activate the vehicle's TCS. In particular, after the controller 14 determines the adjustment factor, the controller 14 determines if the current wheel speed of the vehicle 10 is greater than the sum of the base wheel speed and the adjustment value (at 154). If so, the controller 14 sets an over-target-speed flag to "TRUE" (i.e., "WhlSpdOverTar") (at 155) and activates the vehicle's TCS (at 156). The TCS performs various actions to attempt to secure traction for the vehicle as is known in the art. The TCS can be programmed to execute the actions for a predetermined period of time or execute a predetermined number of actions or cycles to attempt to stop or mitigate a wheel-spinning situation. In other embodiments, the controller 14 instructs the TCS when to stop corrective actions (e.g., after the controller 14 no longer detects a wheel-spinning situation).

Figure 6B:
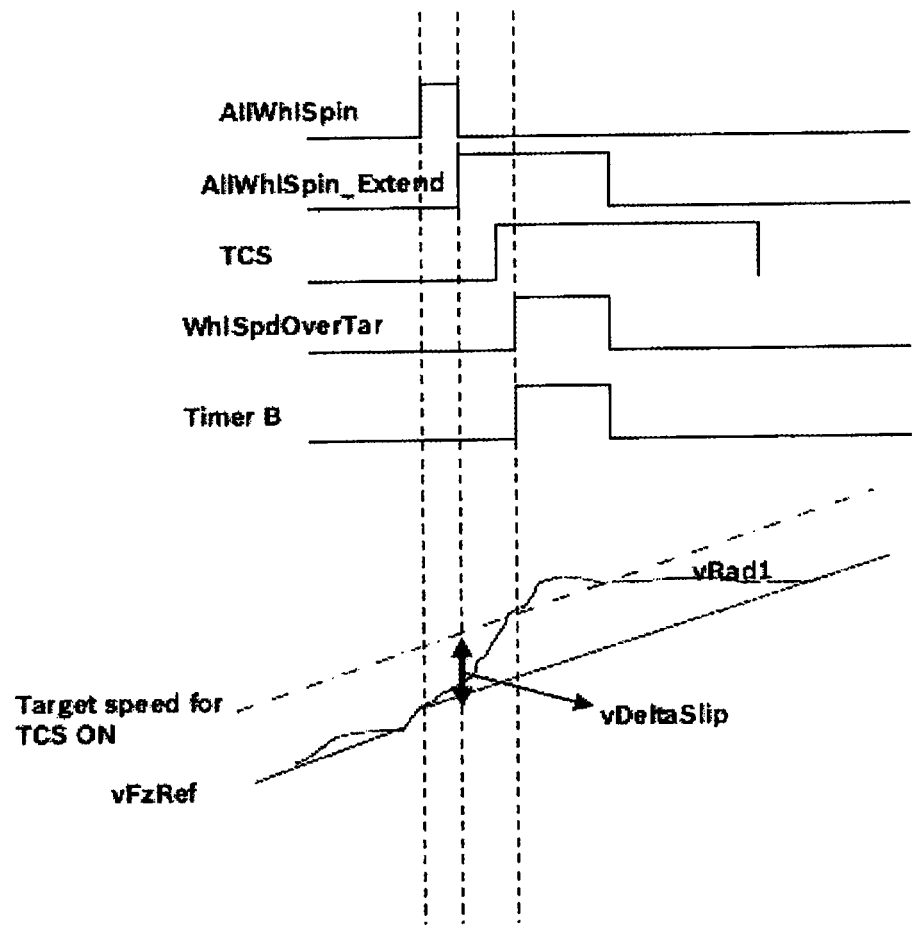

As shown in FIG. 6a, after the controller 14 activates the TCS (at 156), the controller 14 starts a timer (i.e., "Timer B") counting up (at 157). After the timer reaches a predetermined time (e.g., approximately 200 milliseconds) (at 158), the controller 14 resets the timer (i.e., "Timer B"), resets the adjustment factor to zero, sets the over-target-speed flag to "FALSE," and sets extension of the all-wheel-spinning flag to "FALSE" (at 160). FIG. 6b graphically illustrates the values of flags and timers used by the controller 14 to execute the method 150 for a sample vehicle situation.

Figure 7A:
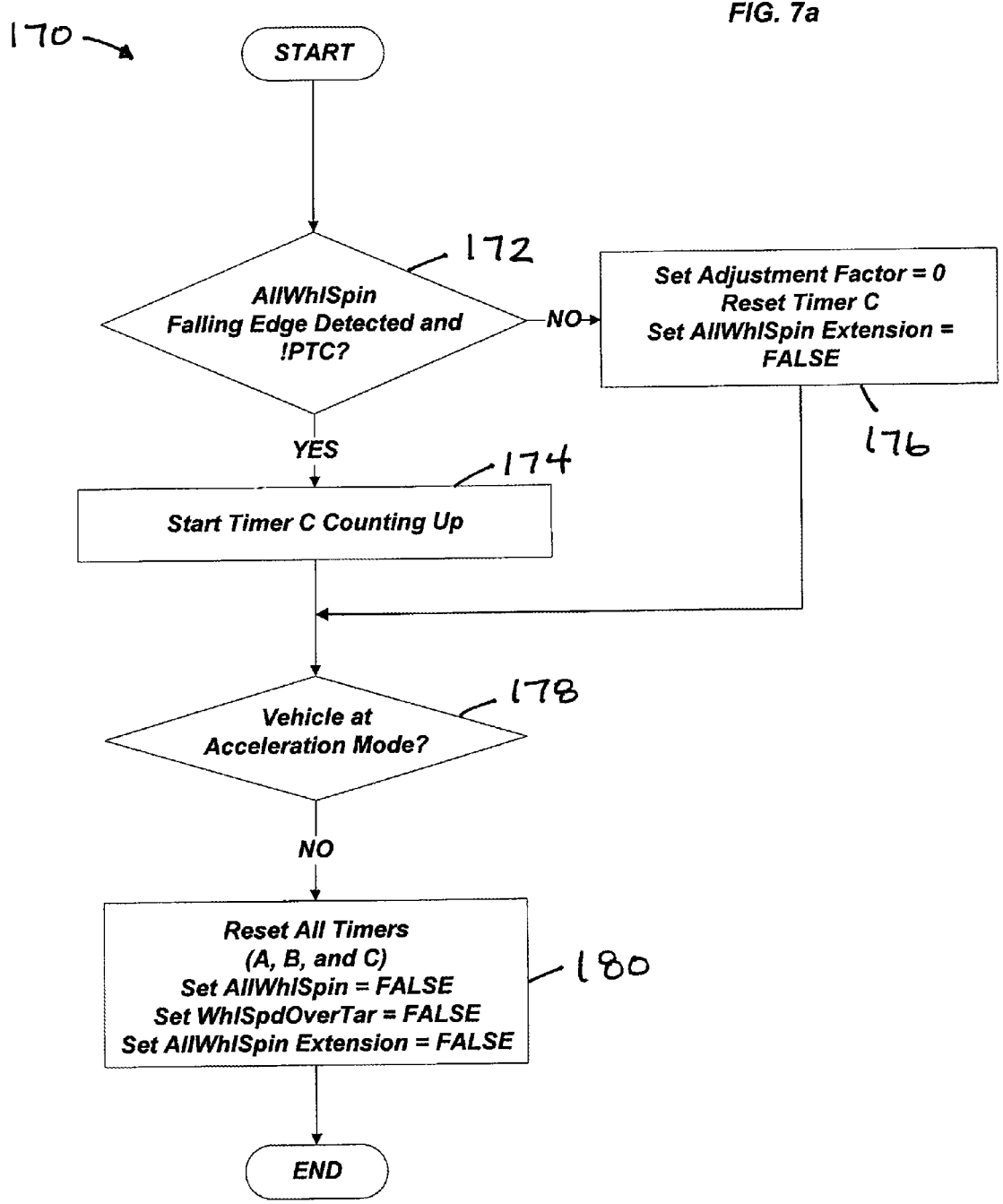

FIG. 7a is a flow chart illustrating another reactive method performed by the controller 14 according to one embodiment of the invention. In particular, FIG. 7a illustrates a method 170 performed by the controller 14 when the current wheel speed of the vehicle 10 is not greater than the sum of the base wheel speed and the adjustment value. For example, as illustrated in FIG. 7a, when the falling edge of the all-wheel-spinning flag has been detected and the TCS is not active (at 172), the controller 14 starts a timer ("Timer C") counting up to approximately 500 milliseconds (at 174). The timer allows additional time for the vehicle's speed to exceed the target speed (e.g., the sum of the base wheel speed and the adjustment value). While the timer (i.e., Timer C) is counting up, the controller 14 can continue to determine if the current wheel speed of the vehicle 10 is greater than the sum of the base wheel speed and the adjustment value (see FIG. 6a, at 154).

If the falling edge of the all-wheel-spinning flag has not been detected or the TCS is active (at 172), the controller resets the adjustment factor to zero, resets the timer (i.e., Timer C) to zero, and sets the extension of the all-wheel-spinning flag to "FALSE" (at 176).

Figure 7B:
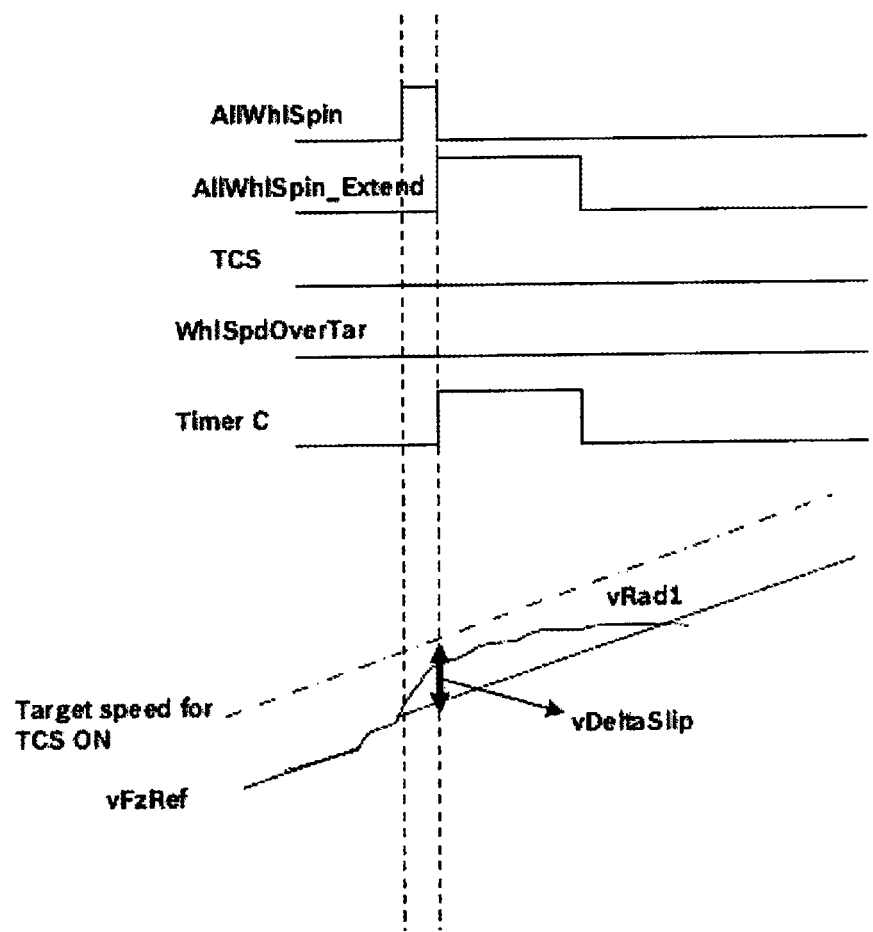

As also illustrated in FIG. 7a, while the timer (i.e., Timer C) is counting up and/or after the timer reaches approximately 500 milliseconds, the controller 14 can determine if the vehicle is accelerating (at 178). If the vehicle is not accelerating, the controller 14 can reset all of the timers (i.e., Timer A, Timer B, and Timer C) to zero, sets the all-wheel-spinning flag to "FALSE," sets the over-target-speed flag to "FALSE", and sets the extension of the all-wheel-spinning flag to "FALSE" (at 180). FIG. 7b illustrates the values of flags and timers used by the controller 14 to execute the method 170 for a sample vehicle situation.

Figure 8:
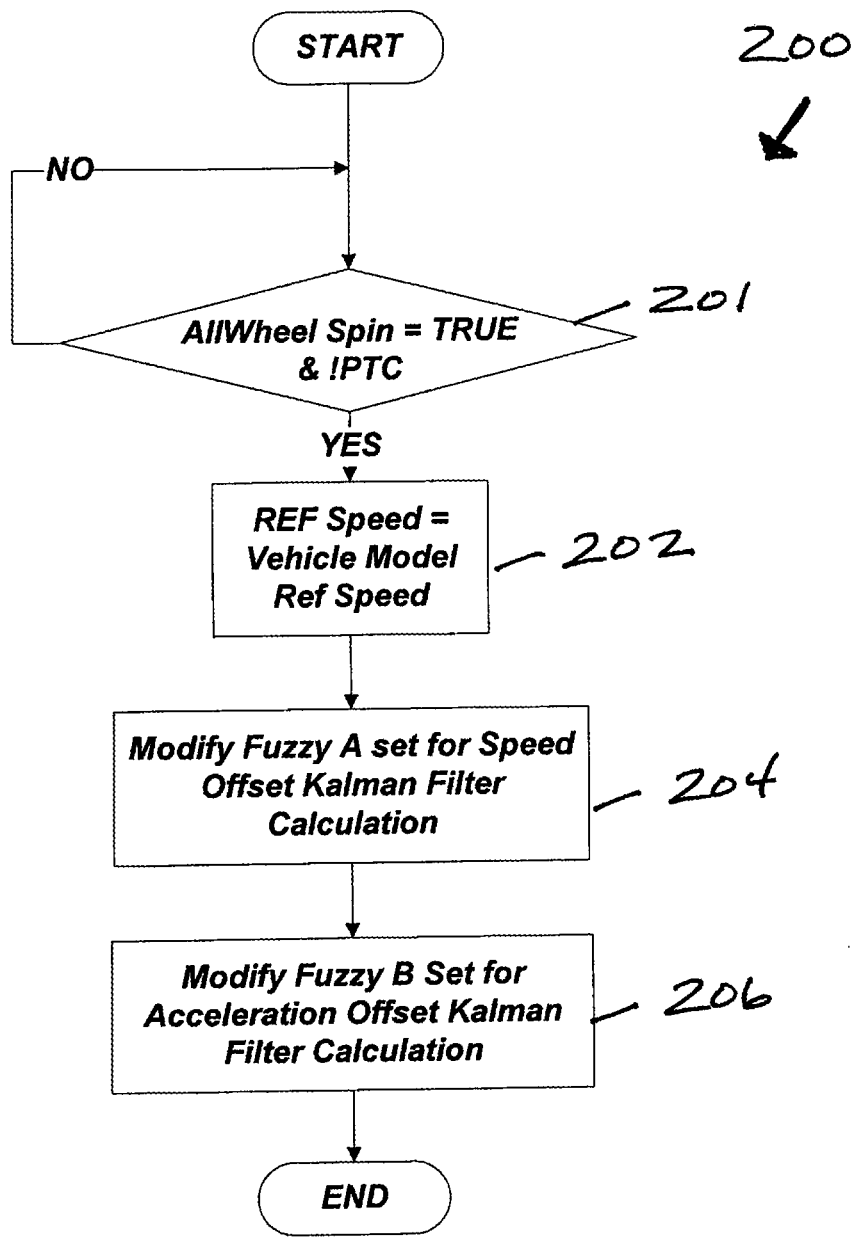
FIG. 8 is a flow chart illustrating a vehicle reference speed update method performed by the system of FIG. 1.

In some embodiments, when the all-wheel-spinning flag is set to "TRUE," the controller 14 also adjusts the base or reference speed associated with the TCS. For example, FIG. 8 illustrates a method 200 performed by the controller 14 adjust the reference speed. In some embodiments, the controller 14 adjusts the reference speed to follow a vehicle acceleration model. In particular, as illustrated in FIG. 8, after the controller 14 sets the all-wheel-spinning flag and the TCS is not active (e.g., the TCS is not performing power-train torque control ("!PTC")) (at 201), the controller 14 sets the reference speed to a vehicle model speed (at 202). The vehicle model speed is based on a vehicle acceleration model (aModel), which is $V=V_{k-1}+aModel*\Delta T$.

The controller 14 also modifies a fuzzy set for a speed-offset, Kalman-filter calculation (i.e., "Fuzzy A set") (at 204) and modifies a fuzzy set for an acceleration-offset, Kalman-filter calculation (at 206).

With these adjustments made, the controller 14 can better identify future wheel-spinning situations (e.g., occurring on icy surfaces), which lets the TCS properly activate and reduces vehicle instability during acceleration on surfaces with low coefficients of friction.

It should be understood that the controller 14 can also be configured to perform other vehicle control processes in addition to wheel-spinning detection. For example, in some arrangements, the controller 14 also controls the vehicle's traction control system ("TCS") and/or the vehicle's electronic stability control ("ESC") system.

Various features and advantages of the invention are set forth in the following claims.

What is claimed is:

1. A system for detecting wheel-spinning situations of a vehicle, the system comprising:
a controller configured to determine a speed of each wheel of the vehicle based on information received from a plurality of wheel speed sensors, to identify a second slowest wheel of the vehicle based on the speed of each wheel, to calculate a vehicle acceleration torque based on an acceleration of the second slowest wheel of the vehicle and a mass of the vehicle, to calculate a torque ratio based on the vehicle acceleration torque and a wheel drive torque, and to activate a traction control system when the torque ratio is greater than a predetermined threshold.

2. The system of claim 1, wherein the predetermined threshold is approximately 1.0.

3. The system of claim 1, wherein the predetermined threshold is approximately 3.0.

4. The system of claim 1, further comprising the plurality of wheel speed sensors, wherein each of the plurality of wheel speed sensors is associated with a wheel of the vehicle.

5. The system of claim 1, wherein the controller is further configured to calculate the acceleration of the second slowest wheel.

6. The system of claim 1, wherein the controller is further configured to calculate a differential of the torque ratio, to calculate a vehicle acceleration, to calculate a vehicle speed, and to determine if the vehicle is traveling on a gravel road.

7. The system of claim 6, wherein the controller is configured to activate the traction control system when the differential of the torque ratio is greater than approximately zero, the vehicle acceleration is greater than a second predetermined threshold, the vehicle speed is less than a third predetermined threshold, the wheel drive torque is greater than a fourth predetermined threshold, and the vehicle is not traveling on a gravel road.

8. The system of claim 1, wherein the controller is further configured to determine an adjustment factor for a reference speed associated with the traction control system.

9. The system of claim 8, wherein the controller is configured to activate the traction control system when a vehicle speed is greater than a sum of the adjustment factor and the reference speed.

10. The system of claim 9, wherein the controller is configured to set the reference speed based on a vehicle model reference speed.

11. A computer-implemented method for detecting wheel-spinning situations of a vehicle, the method comprising:
receiving, at a processor, information from a plurality of wheel speed sensors;
determining, at the processor, a speed of each wheel of the vehicle based on the information from the plurality of wheel speed sensors;
identifying, at the processor, a second slowest wheel of the vehicle based on the speed of each wheel,
calculating, at the processor, a vehicle acceleration torque based on an acceleration of the second slowest wheel of the vehicle and a mass of the vehicle,
calculating, at the processor, a torque ratio based on the vehicle acceleration torque and a wheel drive torque, and
activating a traction control system when the torque ratio is greater than a predetermined threshold.

12. The method of claim 11, wherein activating a traction control system includes activating the traction control system when the torque ratio is greater than approximately 3.0.

13. The method of claim 11, further comprising calculating an acceleration of the second acceleration of the second slowest wheel.

14. The method of claim 11, further comprising calculating a differential of the torque ratio, calculating a vehicle acceleration, calculating a vehicle speed, and determining if the vehicle is traveling on a gravel road.

15. The method of claim 14, wherein activating the traction control system includes activating the traction control system when the differential of the torque ratio is greater than approximately zero, the vehicle acceleration is greater than a second predetermined threshold, the vehicle speed is less than a third predetermined threshold, the wheel drive torque is greater than a fourth predetermined threshold, and the vehicle is not traveling on a gravel road.

* * * * *